(12) United States Patent
Johnson

(10) Patent No.: US 8,755,483 B2
(45) Date of Patent: Jun. 17, 2014

(54) NUCLEAR FUEL

(75) Inventor: Gregory A. Johnson, Camarillo, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 1084 days.

(21) Appl. No.: 12/823,408

(22) Filed: Jun. 25, 2010

(65) Prior Publication Data

US 2011/0317800 A1    Dec. 29, 2011

(51) Int. Cl.
*G21C 3/00*    (2006.01)

(52) U.S. Cl.
USPC .......................................... 376/423

(58) Field of Classification Search
USPC .................................. 376/409–457
See application file for complete search history.

(56) References Cited

U.S. PATENT DOCUMENTS

| | | | |
|---|---|---|---|
| 3,822,185 A * | 7/1974 | Wetch et al. ................. | 376/417 |
| 4,278,560 A | 7/1981 | Sondermann | |
| 4,279,697 A | 7/1981 | Overhoff et al. | |
| 4,355,002 A * | 10/1982 | Hosokawa et al. ........... | 376/419 |
| 4,668,468 A * | 5/1987 | Santucci ..................... | 376/419 |
| 4,671,927 A | 6/1987 | Alsop | |
| 4,735,767 A | 4/1988 | Mallener et al. | |
| 4,749,529 A | 6/1988 | Halldahl | |
| 4,780,268 A | 10/1988 | Papai et al. | |
| 5,257,298 A | 10/1993 | Yuda et al. | |
| 5,350,542 A | 9/1994 | Grossman et al. | |
| 5,440,598 A | 8/1995 | Reese et al. | |
| 5,490,186 A | 2/1996 | Gilmore et al. | |
| 5,515,405 A | 5/1996 | Gilmore et al. | |
| 5,524,033 A | 6/1996 | Hida et al. | |
| 6,445,759 B1 | 9/2002 | Hiraiwa et al. | |
| 6,730,180 B1 | 5/2004 | Mizia et al. | |
| 6,919,576 B2 | 7/2005 | Wright et al. | |
| 2003/0102445 A1 * | 6/2003 | Kamoshida et al. ........ | 250/507.1 |
| 2004/0060390 A1 * | 4/2004 | Carden ........................ | 75/232 |
| 2005/0115359 A1 * | 6/2005 | Carden ........................ | 75/235 |
| 2008/0144762 A1 * | 6/2008 | Holden et al. ............... | 376/416 |
| 2011/0080987 A1 | 4/2011 | Watanabe et al. | |

FOREIGN PATENT DOCUMENTS

| | | |
|---|---|---|
| JP | 0854484 | 2/1996 |
| RU | 2178595 | 1/2002 |
| RU | 2214633 | 10/2003 |
| RU | 42128 | 11/2004 |
| RU | 2007149499 | 7/2009 |

* cited by examiner

*Primary Examiner* — Timothy A Brainard

(74) *Attorney, Agent, or Firm* — Carlson, Gaskey & Olds, P.C.

(57) ABSTRACT

A nuclear fuel composition includes a nuclear fissile material and a neutron-absorption material that adjoins the nuclear fissile material. The nuclear fuel composition may be used in a nuclear reactor, such as a thermal reactor.

21 Claims, 2 Drawing Sheets

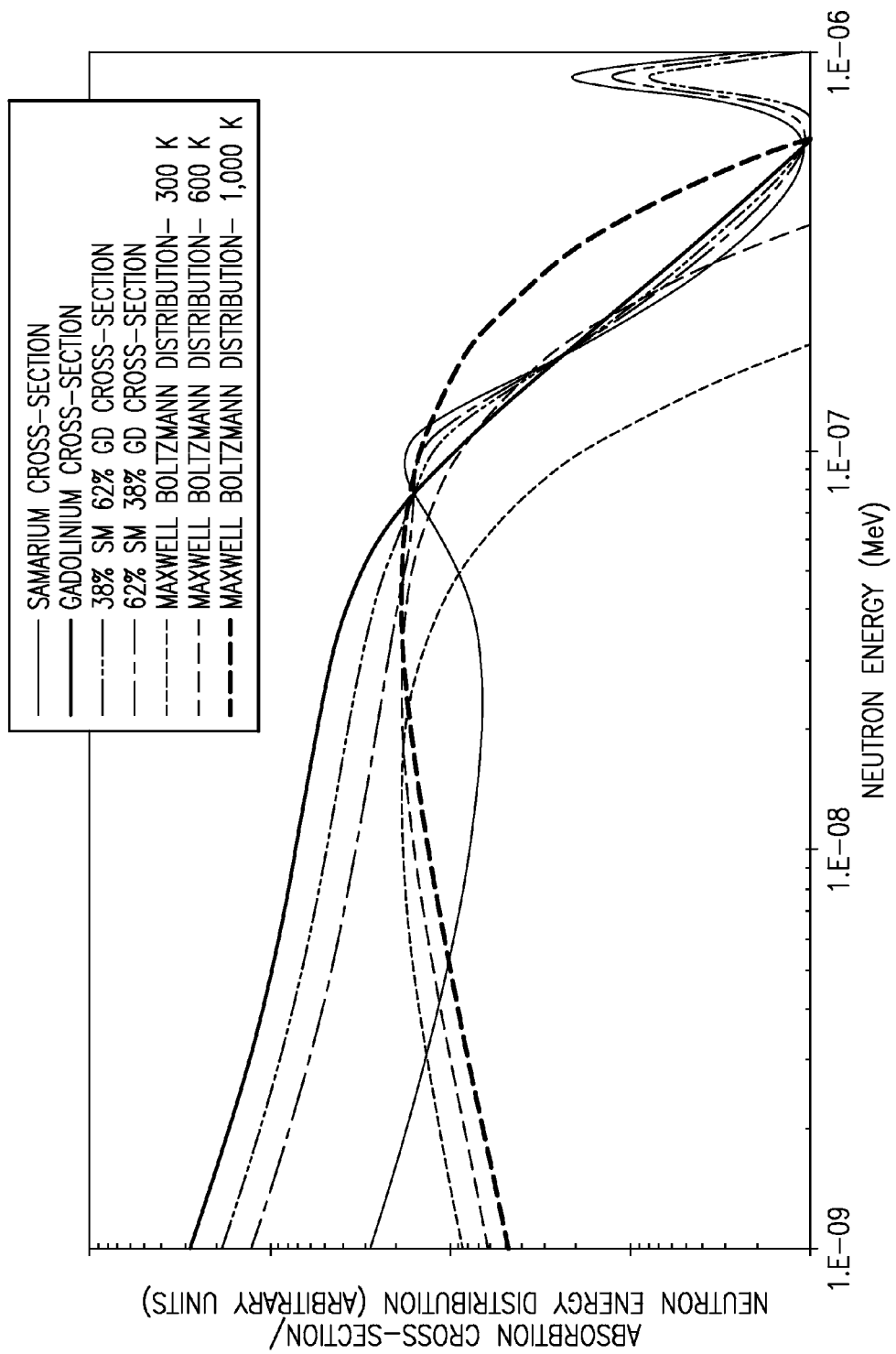

NUCLEAR FUEL

BACKGROUND

This disclosure relates to a nuclear fuel composition for rendering the fuel inherently subcritical.

Compact nuclear reactors may be used in vehicles, such as aerospace vehicles, as a power plant to propel the vehicle and/or to run the vehicle operating systems. In the event of a vehicle accident, the reactor may lose coolant and become exposed to foreign materials, such as water, sand, or other substances. Under such conditions, current nuclear fissile fuels for thermal and epithermal reactors would be expected to reach nuclear criticality. The use of thermal and epithermal nuclear reactors in vehicles is therefore limited.

SUMMARY

An example nuclear fuel composition includes a nuclear fissile material and a neutron-absorption material that adjoins the nuclear fissile material. The nuclear fuel composition may be used in a nuclear reactor, such as a thermal reactor.

An exemplary method of rendering a nuclear fuel inherently subcritical includes forming the nuclear fuel from a nuclear fissile material and a neutron-absorption material that adjoins the nuclear fissile material. The neutron-absorption material has a neutron absorption energy range that overlaps a thermal energy range of neutrons from the nuclear fissile material to render the nuclear fuel inherently subcritical.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1B illustrates absorption cross section per neutron energy distribution versus neutron energy for several example neutron-absorption materials.

DETAILED DESCRIPTION OF THE PREFERRED EMBODIMENT

Figure 1A:
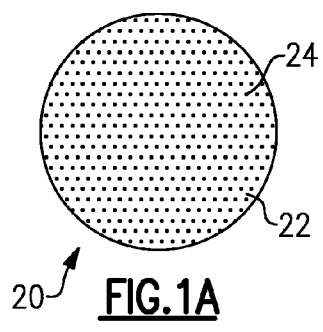
FIG. 1A illustrates an example nuclear fuel that includes a nuclear fissile material mixed with a neutron-absorption material.

FIG. 1A schematically illustrates an example nuclear fuel 20 that may be used in a nuclear reactor, such as a compact epithermal or thermal reactor, for vehicles, aerospace applications, or other uses. As will be described, the composition of the nuclear fuel 20 renders the fuel inherently subcritical, such that if there is an incident that exposes the core of the reactor to outside substances, such as water and sand, the fuel remains subcritical. As an example, the current U.S. aerospace nuclear safety posture requires reactors to remain subcritical in accidents, which has been achieved for fast reactors but not thermal or epithermal reactors.

The composition of the nuclear fuel 20 includes a nuclear fissile material 22 and a neutron-absorption material 24 that adjoins the nuclear fissile material 22 to render the fuel inherently subcritical. That is, the neutron-absorption material 24 is in contact with or directly contiguous with the nuclear fissile material 22, which facilitates absorption of neutrons from the nuclear fissile material 22.

The nuclear fissile material 22 may be any of a variety of different types of fissile material. For instance, the nuclear fissile material 22 may be a uranium-based material, such as a uranium hydride or uranium oxide. In one example, the nuclear fissile material 22 is uranium-zirconium-hrdride ($UZrH_x$) and it is used in combination with a sodium-potassium coolant (e.g., NaK-78). In this case, the neutron-absorption material 24 may also be a hydride.

The composition of the nuclear fuel 20 may include only a small, effective amount of the neutron-absorption material 24, to avoid poisoning the reactivity of the nuclear fissile material 22. For instance, based on the total combined weight of the neutron-absorption material 24 and the nuclear fissile material 22, the nuclear fuel 20 may include ≤0.5 wt % of the neutron-absorption material 24. In some examples, ≤0.1 wt % of the neutron-absorption material 24 is effective to achieve inherent subcriticality and in further examples ≤0.05 wt % of the neutron-absorption material 24 is needed to achieve inherent subcriticality. For uranium hydride type nuclear fissile materials, the amount ≤0.05 wt % may be effective.

The neutron-absorption material 24 may be a composite of several elements. For instance, the neutron-absorption material 24 may include samarium and a rare earth element, such as gadolinium. The samarium and gadolinium function as neutron absorbers. However, in high amounts, gadolinium destroys the negative temperature coefficient of reactivity of the nuclear fissile material 22. Thus, samarium serves as a substitute for a portion of the gadolinium. That is, samarium has a neutron-absorption energy peak (cross-section) that at least partially overlaps the thermal energy range of the neutrons (e.g., in the range of approximately 0.025 eV) from the nuclear fissile material 22 (e.g., see FIG. 1B). Thus, the samarium functions as an effective neutron absorber in addition to the gadolinium, while avoiding destroying the negative temperature coefficient of reactivity of the nuclear fissile material 22.

The composition of the neutron-absorption material 24 may include 25 wt %-75 wt % of samarium and a remainder of the rare earth element. Although gadolinium is disclosed, it is contemplated that other rare earth elements may also be useful. In further examples, the composition of the neutron-absorption material 24 may include 30 wt %-40 wt % of the samarium and a remainder of gadolinium, or even 35 wt %-38 wt % of the samarium and a remainder of gadolinium. The amount 35 wt %-38 wt % of samarium provides a desirable balance of the neutron-absorbing properties of samarium without high levels of gadolinium that can destroy fissile reactivity.

In the illustrated example, the neutron-absorption material 24 is mixed with the nuclear fissile material 22 to form a composite as the nuclear fuel 20. In this case, the neutron-absorption material 24 is relatively uniformly dispersed through the nuclear fissile material 22. The neutron-absorption material 24 may be mixed with the nuclear fissile material 22 using the same techniques that are used to mix other additives with fissile materials, such as moderators. The nuclear fuel 20 may then be provided in a known manner in the form of a pellet for use in a nuclear reactor.

Figure 2:
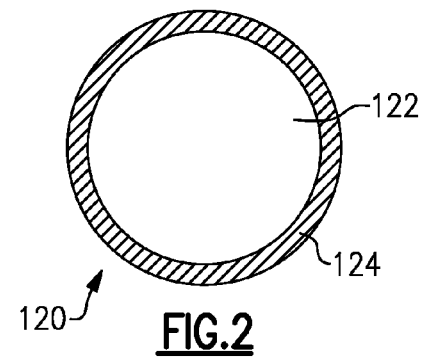
FIG. 2 illustrates another example nuclear fuel that includes a nuclear fissile material with a neutron-absorption material applied as a coating.

FIG. 2 illustrates a modified example of a nuclear fuel 120. In this disclosure, like reference numerals designate like elements where appropriate and reference numerals with the addition of one-hundred or multiples thereof designate modified elements that are understood to incorporate the same features and benefits as the corresponding original elements. In this case, the neutron-absorption material 124 is provided as a coating on the nuclear fissile material 122. For instance, the nuclear fissile material 122 may be a pellet that is coated on a portion or all of its peripheral surfaces with the neutron-absorption material 124.

The neutron-absorption material 124 may be deposited by vapor deposition or other suitable method. Additionally, the thickness of the coating of neutron-absorption material 124 may be controlled such that on a weight percentage basis, the nuclear fuel 120 includes an amount of the neutron-absorption material 124 as described above with reference to FIG. 1.

Figure 3:
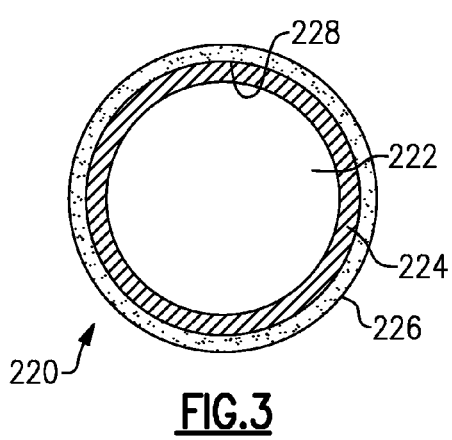
FIG. 3 illustrates another example nuclear fuel hat includes a nuclear fissile material with a neutron-absorption material applied as a coating on a cladding.

FIG. 3 illustrates another example nuclear fuel 220 that is somewhat similar to the example of FIG. 2. In this case, the nuclear fissile material 222 is contained within a hollow cladding 226. The neutron-absorption material 224 is disposed on an inner surface 228 of the hollow cladding 226 such that the neutron-absorption material 224 adjoins the outer peripheral surfaces of the nuclear fissile material 222, which may be provided as pellets within the hollow cladding 226. As an example, the neutron-absorption material 224 may be deposited by vapor deposition onto the inner surface 228 of the hollow cladding 226 or "painted" on in mixture with a carrier solvent that evaporates to leave the neutron-absorption material 224.

Figure 4:
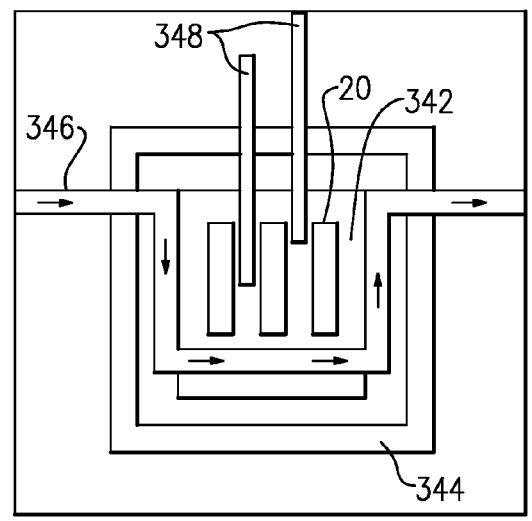
FIG. 4 illustrates an example nuclear reactor.

FIG. 4 illustrates an example nuclear reactor 340 that may employ the nuclear fuel 20, 120 or 220. The nuclear reactor 340 is shown with the nuclear fuel 20. However, it is to be understood that the nuclear fuel 120 or 220 may alternatively be used. The nuclear reactor 340 is a thermal reactor for use in an aerospace vehicle, for example. The nuclear fuel 20 is located within a moderator 342. The nuclear fuel 20 and moderator 342 are contained within a vessel 344 that may prevent the escape of radiation. A coolant system 346 circulates a coolant, such as water or NaK-78, through the core in vessel 344 to heat the coolant for a downstream use, such as power generation. Control rods 348 may be used to moderate the power output in a known manner. Additionally, other components, such as reflectors, etc., may also be used, depending upon the particular implementation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A nuclear fuel composition comprising:
    a nuclear fissile material; and
    a neutron-absorption material adjoining the nuclear fissile material, the neutron-absorption material including 25 wt %-75 wt % samarium as a partial substitute for a remainder amount of a rare earth element to limit destroying a negative temperature coefficient of reactivity of the nuclear fissile material by the rare earth element, wherein the neutron-absorption material comprises ≤0.5 wt % of a combined weight of the nuclear fissile material and the neutron-absorption material.

2. The nuclear fuel composition as recited in claim 1, wherein the rare earth element is gadolinium.

3. The nuclear fuel composition as recited in claim 1, wherein the neutron-absorption material includes 30 wt % -40 wt % of the samarium.

4. The nuclear fuel composition as recited in claim 1, wherein the neutron-absorption material includes 35 wt % -38 wt % of the samarium.

5. The nuclear fuel composition as recited in claim 1, wherein the neutron-absorption material comprises ≤0.1 wt % of the combined weight.

6. The nuclear fuel composition as recited in claim 1, wherein the neutron-absorption material comprises ≤0.05 wt % of the combined weight.

7. The nuclear fuel composition as recited in claim 1, wherein the neutron-absorption material is dispersed within the nuclear fissile material.

8. The nuclear fuel composition as recited in claim 1, wherein the neutron-absorption material is a coating disposed on pellets of the nuclear fissile material.

9. The nuclear fuel composition as recited in claim 1, wherein the nuclear fissile material comprises uranium-zirconium-hydride ($UZrH_x$).

10. The nuclear fuel composition as recited in claim 1, wherein the samarium has a neutron-absorption energy peak (cross-section) that at least partially overlaps a thermal energy range of the neutrons from the nuclear fissile material.

11. A nuclear reactor comprising:
    a nuclear fissile material; and
    a neutron-absorption material adjoining the nuclear fissile material, the neutron-absorption material including 25 wt % -75 wt % samarium as a partial substitute for a remainder amount of a rare earth element to limit destroying a negative temperature coefficient of reactivity of the nuclear fissile material by the rare earth element, wherein the neutron-absorption material comprises ≤0.5 wt % of a combined weight of the nuclear fissile material and the neutron-absorption material.

12. The nuclear reactor as recited in claim 11, wherein the neutron-absorption material is dispersed within the nuclear fissile material.

13. The nuclear reactor as recited in claim 11, wherein the neutron-absorption material is a coating disposed on pellets of the nuclear fissile material.

14. The nuclear reactor as recited in claim 11, further comprising a hollow cladding containing the nuclear fissile material, and the neutron-absorption material is a coating disposed on an inside surface of the hollow cladding.

15. The nuclear reactor as recited in 11, wherein the rare earth element is gadolinium.

16. The nuclear reactor as recited in claim 11, wherein the neutron-absorption material includes 30 wt % -40 wt % of the samarium.

17. A method of rendering a nuclear fuel inherently subcritical, comprising:
    forming nuclear fuel from a nuclear fissile material and a neutron-absorption material adjoining the nuclear fissile material, and the neutron-absorption material includes 25 wt % -75 wt % samarium as a partial substitute for a remainder amount of a rare earth element to limit destroying a negative temperature coefficient of reactivity of the nuclear fissile material by the rare earth element, wherein the neutron-absorption material comprises ≤0.5 wt % of a combined weight of the nuclear fissile material and the neutron-absorption material, and the neutron-absorption material has a neutron absorption energy range that overlaps a thermal energy range of neutrons from the nuclear fissile material to thereby render the nuclear fuel inherently subcritical.

18. The method as recited in claim 17, including dispersing the neutron-absorption material within the nuclear fissile material.

19. The method as recited in claim 17, including depositing the neutron-absorption material as a coating.

20. The method as recited in claim 17, wherein the rare earth element is gadolinium.

21. The method as recited in claim 17, wherein the neutron-absorption material includes 30 wt % -40 wt % of the samarium.

* * * * *